United States Patent
Carro et al.

(10) Patent No.: US 9,292,366 B2
(45) Date of Patent: Mar. 22, 2016

(54) LINKING SOURCES TO COPIED TEXT

(75) Inventors: Fernando Incertis Carro, Valencia (ES); Rita Asuncion Jarillo Sanchez, legal representative, Valencia (ES); Ghislain Imbert De Tremiolles, Paris (FR)

(73) Assignee: International Business Machines Corporation, Armonk, NY (US)

(*) Notice: Subject to any disclaimer, the term of this patent is extended or adjusted under 35 U.S.C. 154(b) by 589 days.

(21) Appl. No.: 13/605,057

(22) Filed: Sep. 6, 2012

(65) Prior Publication Data
US 2012/0331379 A1 Dec. 27, 2012

Related U.S. Application Data

(63) Continuation of application No. 12/088,094, filed as application No. PCT/EP2006/064646 on Jul. 25, 2006, now Pat. No. 8,332,747.

(30) Foreign Application Priority Data

Oct. 7, 2005 (EP) .................................... 05300800

(51) Int. Cl.
*G06F 17/00* (2006.01)
*G06F 9/54* (2006.01)
(Continued)

(52) U.S. Cl.
CPC .............. *G06F 9/543* (2013.01); *G06F 17/218* (2013.01); *G06F 17/2235* (2013.01); *G06F 17/2247* (2013.01); *G06F 17/24* (2013.01)

(58) Field of Classification Search
CPC .... G06F 17/24; G06F 14/218; G06F 17/3089
See application file for complete search history.

(56) References Cited

U.S. PATENT DOCUMENTS 6,499,041 B1 12/2002 Breslau et al.
6,944,821 B1* 9/2005 Bates et al. ................... 715/209
(Continued)

FOREIGN PATENT DOCUMENTS

CN 1588352 3/2005
EP 1259042 11/2001
(Continued)

OTHER PUBLICATIONS

Office Action (Mail Date Jul. 26, 2011) for U.S. Appl. No. 12/088,094, filed May 28, 2009.
(Continued)

*Primary Examiner* — Kyle Stork
(74) *Attorney, Agent, or Firm* — Schmeiser, Olsen & Watts, LLP; John Pivnichny

(57) ABSTRACT

A method and system for processing electronic documents. A temporary computer object is created. An address of a first electronic document is obtained. A first tag, a second tag, and the address of the first electronic document are copied into a header of the created temporary computer object. Selected text from the first electronic document is obtained.

The first and second tag respectively mark the beginning and the end of the header. The address of the first electronic document is disposed between the first and second tags. The selected text and a third tag are copied into the created temporary computer object. The third tag marks the end of the created temporary computer object. The selected text is disposed between the header of the created temporary computer object and the third tag. The created temporary computer object is stored in a second electronic document.

17 Claims, 6 Drawing Sheets

(51) Int. Cl.
　　　*G06F 17/21*　　(2006.01)
　　　*G06F 17/22*　　(2006.01)
　　　*G06F 17/24*　　(2006.01)

(56) References Cited

U.S. PATENT DOCUMENTS

| | | |
|---|---|---|
| 7,340,685 B2 | 3/2008 | Chen et al. |
| 7,424,669 B2 | 9/2008 | Bhogal et al. |
| 7,603,183 B1 | 10/2009 | Munemoto |
| 2002/0054138 A1 | 5/2002 | Hennum |
| 2002/0138653 A1 | 9/2002 | Ogura |
| 2003/0097640 A1 | 5/2003 | Abrams et al. |
| 2003/0229858 A1 | 12/2003 | Keohane et al. |
| 2004/0172584 A1 | 9/2004 | Jones et al. |
| 2004/0221232 A1 | 11/2004 | Morgan |
| 2005/0154993 A1 | 7/2005 | Chen et al. |
| 2005/0160363 A1 | 7/2005 | Bhogal et al. |
| 2005/0203935 A1 | 9/2005 | McArdle |
| 2006/0218492 A1 | 9/2006 | Andrade |
| 2008/0256470 A1 | 10/2008 | Bhogal et al. |
| 2010/0058176 A1 | 3/2010 | Carro et al. |

FOREIGN PATENT DOCUMENTS

| | | |
|---|---|---|
| EP | 1452966 | 9/2004 |
| JP | 8190545 | 7/1996 |
| JP | 10143507 | 5/1998 |
| JP | 2002236679 | 8/2002 |
| JP | 2004126903 | 4/2004 |
| JP | 2004265402 | 9/2004 |
| WO | 2005091904 | 10/2005 |

OTHER PUBLICATIONS

Amendment filed Oct. 24, 2011 in response to Office Action (Mail Date Jul. 26, 2011) for U.S. Appl. No. 12/088,094, filed May 28, 2009.
Final Office Action (Mail Date Dec. 12, 2011) for U.S. Appl. No. 12/088,094, filed May 28, 2009.
Amendment After Final filed Feb. 12, 2012 in response to Final Office Action (Mail Date Dec. 12, 2011) for U.S. Appl. No. 12/088,094, filed May 28, 2009.
Advisory Action (Mail Date Feb. 22, 2012) for U.S. Appl. No. 12/088,094, filed May 28, 2009.
Amendment After Final filed Mar. 6, 2012 in response to Advisory Action (Mail Date Feb. 22, 2012) for U.S. Appl. No. 12/088,094, filed May 28, 2009.
Notice of Allowance (Mail Date Jul. 30, 2012) for U.S. Appl. No. 12/088,094, filed May 28, 2009.
Reply to the Examination Report, IBM, European Patent Office, Dec. 19, 2014, Application No. 06764255.3, 2 pages.
Examination Report, IBM, European Patent Office, Aug. 18, 2014, Application No. 06764255.3, 6 pages.
IBM, System and method for linking copied data to source data, Original Publication Date: May 23, 2005, Ip.com Number: 000125181, 3 pages.
Nelson et al., The Model Primary Content Type for Multipurpose Internet Mail Extensions, Retrieved from internet on Nov. 17, 2015, http://www.iett.org/rfc/rfc2077.text?number=2077, 12 pages.
Borenstein et al., MIME (Multipurpose Internet Mail Extensions) Part One: Mechanisms for Specifying and Describing the Format of Internet Message Bodies, Retrieved from internet on 11/17/205, http://web.archive.org/web/20010725010911http://archive.ncsa.uiuc.ed, 74 pages.

* cited by examiner

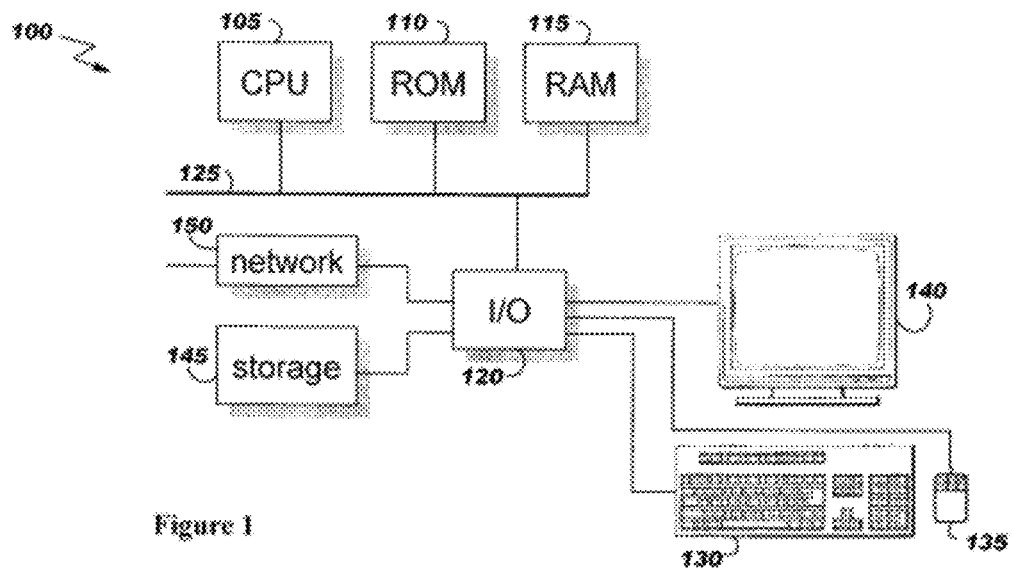
Figure 1
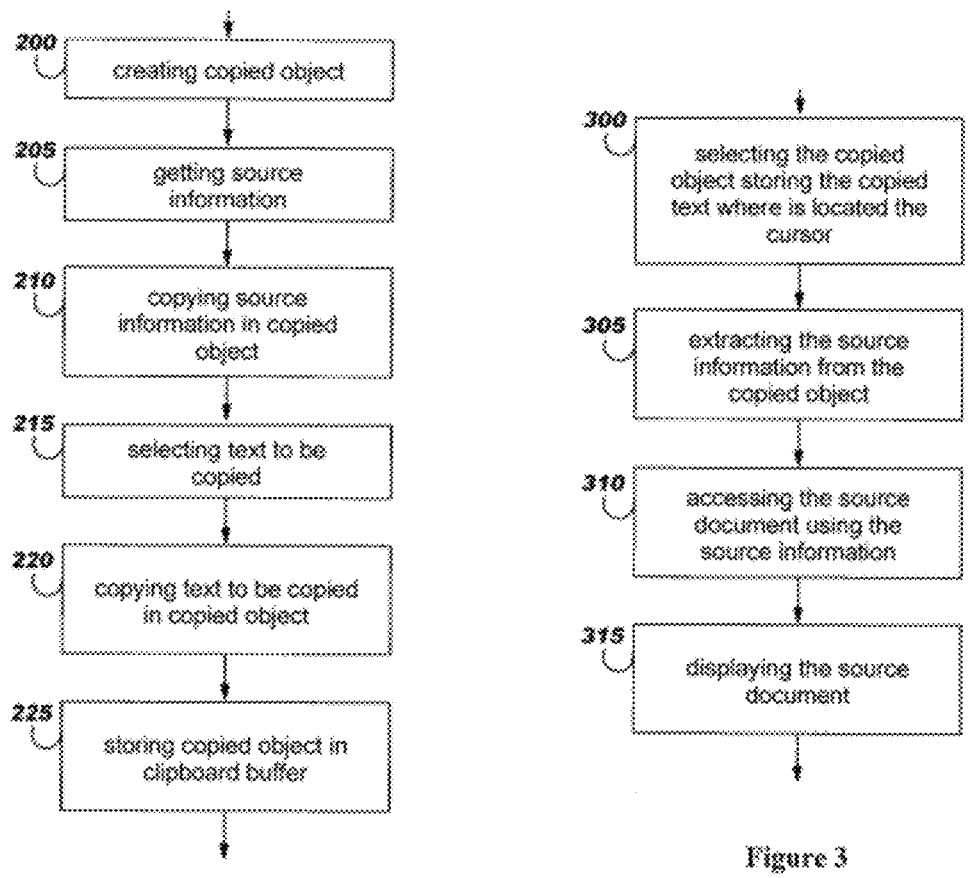
Figure 2
Figure 3

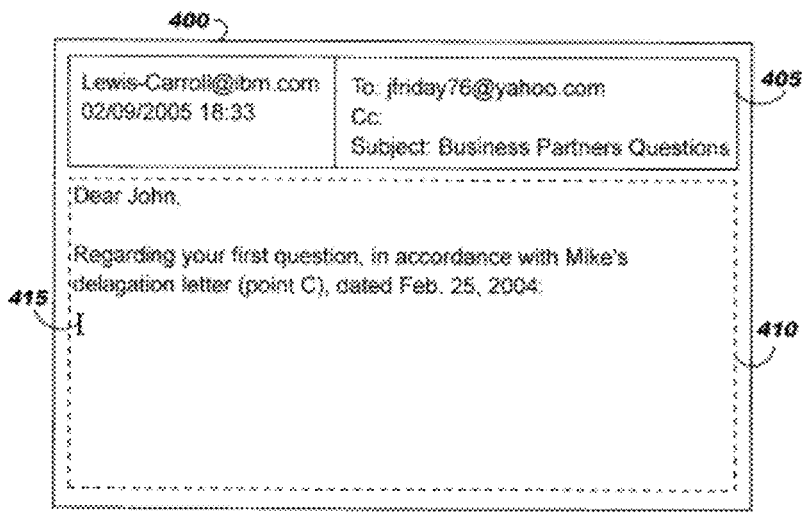
Figure 4a
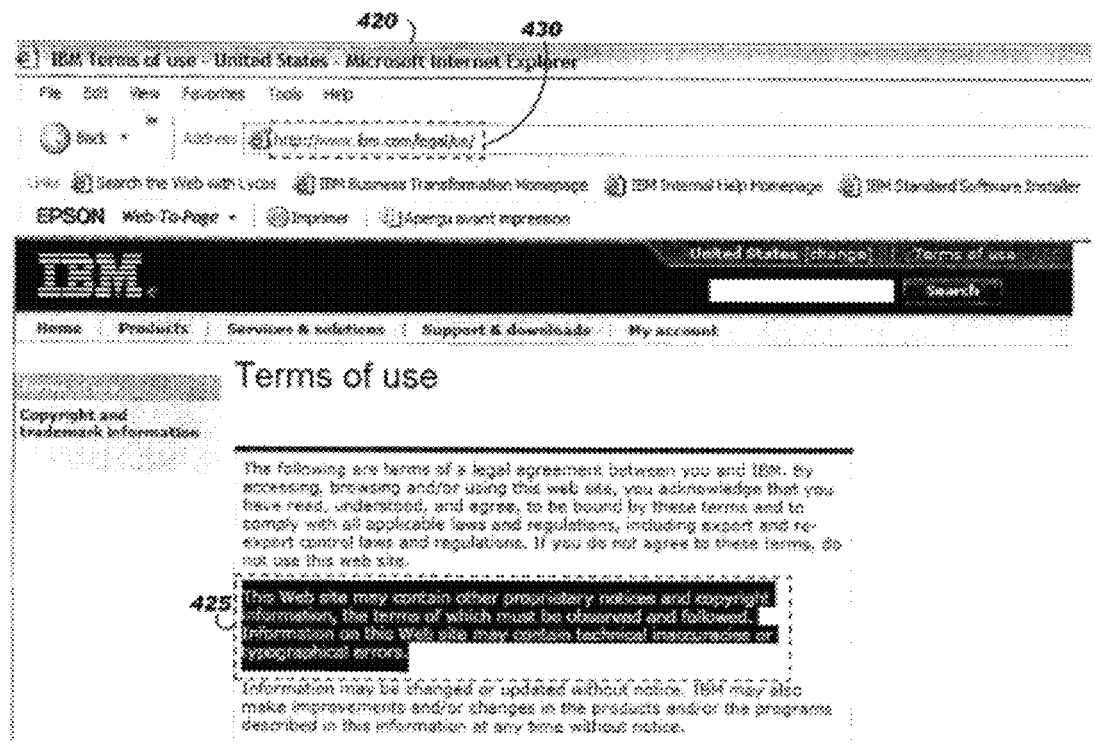
Figure 4b
Figure 4c

LINKING SOURCES TO COPIED TEXT

This application is a continuation application claiming priority to Ser. No. 12/088,094, filed Mar. 26, 2008, now U.S. Pat. No. 8,332,747, issued Dec. 11, 2012.

FIELD OF THE INVENTION

The present invention relates generally to methods and systems for authoring, referencing, and manipulating documents and more specifically to a method and systems for linking sources to text copied from these sources.

BACKGROUND OF THE INVENTION

Computer objects such as texts or images are very often cut or copied from one document e.g., from a web page, and pasted into another document e.g., in a Lotus WordPro document (Lotus and WordPro are Trademarks of International Business Machine Corporation). Different types of objects, such as text portions, images, or audio clips, can be copied by a user from multiple source documents and pasted into an object document. It is a common practice today, for many people, to compose documents including portions that are "imported" i.e., copied and pasted, from another documents e.g., from web pages accessed through the Internet.

Most of modern word processing application programs allow a user to copy blocks of text from different documents and to transfer them to another document. Copying an item such as a block of text from a first document into a second document is generally referred to as a "copy and paste operation". When an item is copied from a source document, it is generally stored in a temporary buffer called a clipboard. This allows the user to later paste the item into the desired object document, at the right location. The action of transferring the copied item to a determined location of the object document is referred to as "paste".

Authors and publishers place considerable proprietary value in their creations and in particular, in the textual passages they generate e.g., in newspapers and magazine articles. Unfortunately, the ease with which textual passages can be duplicated in electronic storage media presents the problem that such passages can be copied and/or incorporated into other electronic documents without proper attribution or remuneration of the original author. This copy may occur either without modification of the original passage or with minor revisions such that original authorship cannot reasonably be disputed. Furthermore, authors and researchers often have the need to locate the sources of given passages cited in documents, but frequently do not know the title, author, date of publication, or other identifying features of the original work. As a consequence, unless the user has an exact quotation, it can be very difficult to find the source of the passage in order to give proper recognition to the original author.

When objects such as text portions are copied from one or from several source documents into an object document, source information is the information required to identify the source documents from which each one of said text portions have been copied. Source information may include, for example, address where the document can be found, copyright information, authorship information, references to contract's terms and conditions, citations and footnotes. When portions of documents are copied through networks, such as the Internet, source information may include, for instance, the Uniform Resource Locator (URL) of a web page from which a text portion has been copied.

According to the prior art, several systems and methods exist for providing source information of an object copied from a first document and inserted into a second document. For example, U.S. patent application Ser. No. 10/165,083. by Keohane et al., discloses a method, apparatus, and computer instructions for automatically generating source information for an object that is cut or copied from a document and inserted into another document. The source information can be stored, hidden, or pasted into the destination document, and can also trigger automatically the generation of a footnote for the destination document.

An important limitation not solved by Keohane et al., nor by the other known methods for providing source information of copied textual objects, lies in the lack of persistency of the source information. By lack of persistency of the source information, one should understand that, if an object e.g., a portion of text, copied by a user from a source document to an object document, is itself edited by the user in the second document e.g., a portion of the copied text is modified, or if a sub-portion is cut and pasted by the user into a different paragraph of the object document, the source information associated to the copied portion, and the generated sub-portions, is lost.

The traceability and the persistency of copied objects is an important issue for intellectual property protection and copyrights enforcement. As it is widely established by copyright laws in most countries, material paraphrased or summarized from other sources should be, clearly indicated as such, and it should be clearly distinct from the author's own statements and credited to the original source.

Moreover, not merely to enforce copyrights protection, but also for the purposes of authoring, documenting and referencing edited materials, when the copy and paste process is used during a document edition, it would be very useful to automatically create a link, or hyperlink, from each textual portion copied into an object document, to the source document from which said textual portion has been copied. Furthermore, it would be required not only to automatically associate links, or hyperlinks, from copied textual portions to the source information, but also from all textual sub-portions or textual fragments that could be generated therefrom when editing the object document.

Therefore, there is a need to provide a method and systems for identifying imported textual objects which have been copied or have been generated by editing textual objects already copied from other source documents. There is also a need to provide a method and systems for referencing and accessing, from imported textual objects, copied from different documents, or originated by editing text already copied from different documents, the source documents from which they have been copied.

SUMMARY OF THE INVENTION

Thus, it is a broad object of the invention to remedy the shortcomings of the prior art as described here above.

It is another object of the present invention to provide a method and systems for identifying into a text document, textual portions that have been copied or imported from other documents, while referencing, in each copied portion, the source document from which it has been copied.

It is another object of the invention to provide a method and systems for marking and highlighting copied textual portions and for warning a user when attempting to edit a copied textual portion.

It is another object of the invention to provide a method and systems for persistently identifying all textual sub-portions generated when splitting copied textual portions or removing words or letters in copied textual portions, and to reference, in each of them, the corresponding source documents from which they have been copied.

It is still another object of the invention to provide a method and systems for accessing, from a selected copied textual portion or sub-portion, the source document from which said portion or sub-portion has been copied.

It is a particular object of the invention to provide a method and systems for automatically identifying and highlighting copied textual portions or sub-portions in the object document.

The accomplishment of these and other related objects is achieved by a temporary computer object for copying and pasting text from a first electronic document to a second electronic document, said computer object comprising,
- a first tag marking the beginning of the header of said temporary computer object;
- the address of said first electronic document;
- a second tag marking the end of said header of said temporary computer object;
- said copied text to be pasted; and,
- a third tag marking the end of said temporary computer object, by a method for copying a selected text from a first electronic document into a temporary computer object as defined above, said method comprising the steps of,
- creating said temporary computer object;
- getting the address of said first electronic document;
- copying said address of said first electronic document into said created temporary computer object;
- getting said selected text from said first electronic document;
- copying said selected text into said created temporary computer object; and,
- storing said created temporary computer object, by a method for pasting a text from a temporary computer object as defined above into a second electronic document, said method comprising the steps of,
- checking if said second electronic document comprises said first tag marking the beginning of the header of a temporary computer object;
- if said second electronic document comprises said first tag marking the beginning of the header of a temporary computer object,
  - checking if the text to paste stored within said temporary computer object comprises said first tag marking the beginning of the header of said temporary computer object;
  - if the text to paste stored within said temporary computer object comprises said first tag marking the beginning of the header of said temporary computer object,
    - extracting the identifiers associated to each of said first tag marking the beginning of the header of the temporary computer object comprised within said text to paste;
    - extracting the identifier associated to said temporary computer object; and,
    - modifying all of said extracted identifiers that are identical to the one contained within said second electronic document, by a method for checking edited text to track modifications in text copied from a first document, said copied text being stored according to the temporary computer object structure as defined above, said method comprising the steps of,
- if a portion of text is removed or inserted in said copied text,
  - inserting said third tag marking the end of a temporary computer object, at the position where said portion of text is removed or at the position preceding the one where said portion of text is inserted; and,
  - inserting a string formed by concatenating said first tag marking the beginning of the header of a temporary computer object, the address associated to said copied text, and said second tag marking the end of the header of a temporary computer object, at the position where said portion of text is removed or at the position preceding the one where said portion of text is inserted;

and by a method for accessing a first electronic document from a second electronic document comprising a portion of text pasted from a temporary computer object as defined above, said temporary computer object storing said portion of text extracted from said first electronic document and the address of said first electronic document, said method comprising the steps of,
- selecting said temporary computer object storing said portion of text;
- extracting the address stored within said selected temporary computer object;
- accessing said first electronic document using said address; and,
- displaying said first electronic document.

Further embodiments of the invention are provided in the appended dependent claims.

According to one aspect of the invention, a method is disclosed for enabling the author of an object document to import textual portions from other source documents, and to edit said object document while automatically referencing and linking all imported textual portions and all textual sub-portions created from them when editing the object document, to the source documents from which they have been imported.

According to another aspect of the invention, a method is disclosed for enabling the author or the recipient of a document comprising textual portions or fragments of textual portions copied from a plurality of source documents, to identify those textual portions.

According to another aspect of the invention, a method is disclosed for enabling the author or the recipient of a document comprising textual portions or fragments of textual portions copied from a plurality of source documents, to access the corresponding source documents, and to automatically search and locate in said source documents, source text from which said textual objects have been copied.

One of the advantages of the invention is that, not only all copied textual portions, but also all textual sub-portions generated from a textual portion copied from a source document in the object document, remain persistently linked to the source document from which the original textual portion has been copied.

The invention can be practiced by means of software implementing the disclosed systems and method running on word processors, web browsers, and the likes.

Further advantages of the present invention will become apparent to the ones skilled in the art upon examination of the drawings and detailed description. It is intended that any additional advantages be incorporated herein.

BRIEF DESCRIPTION OF THE DRAWINGS

FIG. 1 illustrates a block diagram of a generic computer device in which the present invention can be implemented.

FIG. 2 depicts the main steps of the modified copy function according to the invention.

FIG. 3 shows the main steps of the access function according to the invention.

FIG. 4, comprising FIG. 4a to FIG. 4e, illustrates the main steps of the use of the modified copy function according to the invention.

FIG. 5 illustrates an example of the warning message displayed to the user when attempting to copy a copied text.

FIG. 7, comprising

DETAILED DESCRIPTION OF THE PREFERRED EMBODIMENT

Figure 6:
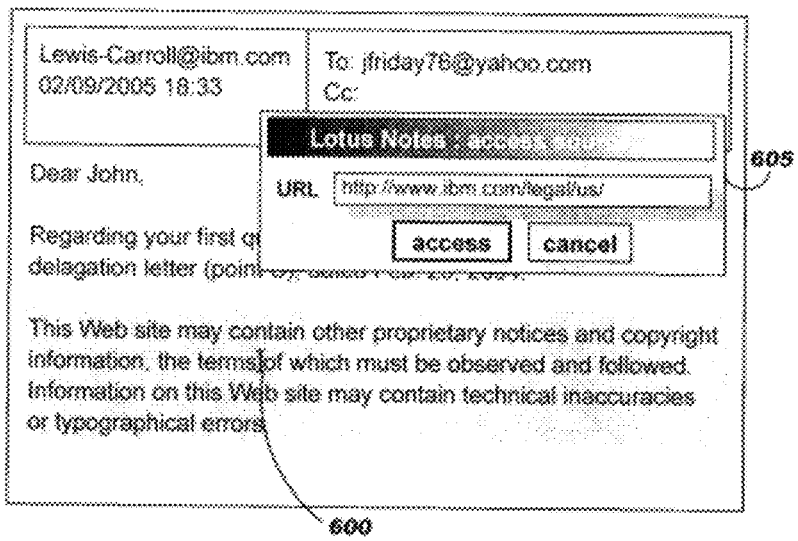
FIG. 6 depicts an example of accessing the source document from a copied portion of text.

FIG. 1 illustrates a block diagram of a generic computer device, handheld device, or any kind of network connected device, generally referred to as computer 100, in which the present invention can be implemented. The system has a central processing unit (CPU) 105, a Read-Only Memory (ROM) 110, a Random Access Memory (RAM) 115, and an I/O subsystem 120, all of them being connected to a system bus 125. The I/O subsystem 120 may include one or more controllers for input/output devices such as keyboard 130, cursor control device 135, display device 140, mass storage device 145, and network interface 150. Depending upon the application of the system 100, one or more further I/O devices may be connected to the I/O subsystem 120. Typically, the hardware system 100 is controlled by an operating system that can be stored in ROM 110 or in mass storage device 145, which in turn controls various tools and applications that are generally loaded in RAM 115.

According to the invention there is provided a set of modified functions for word processors, web browsers, and more generally for all computer applications allowing text copy, cut and/or paste functions, and text edit function. The aim of this modified set of functions is to get the data source information of a text when it is copied and to transmit this data source information within the text when it is pasted or edited.

Set of Modified Functions

The set of modified function comprises at least a modified copy function and a modified paste function. In a preferred embodiment, the set of modified functions further comprises an edit monitoring function and an access function.

Modified Copy Function

According to the modified copy function, source information associated to the selected text to be copied is extracted and associated with the selected text to be copied in a dedicated data structure, referred to as copied object. In a preferred embodiment, the copied object structure is as follows, <©href="path or URL"; optional data©>copied text</©> wherein,

<© marks the beginning of the header of the copied object structure;

href="path or URL" encodes the path or URL of the document from which the copied text has been extracted;

; is a separator. This symbol is used only in the case where "optional data" is stored in the object along with the source information;

optional data encodes additional optional source information, such as the name of the author, the date of creation, and the owner of intellectual property rights of the source document;

©> marks the end of the copied object structure header;

copied text is the portion of text that has been extracted from the source document; and, </©> marks the end of the copied object structure.

As illustrated on FIG. 2 and according to the modified copy function, the following steps are executed when this function is invoked, once having selected the text to be copied, creating a copied object (step 200);

getting the source information (step 205);

copying the source information within the header of the created copied object (step 210);

getting the selected text to be copied (step 215);

copying the selected text within the created copied object (step 220); and, storing the created copied object into the clipboard buffer (step 225).

The source information can be easily accessed from the information associated to the document from which the text is being copied, or from the properties of this document. For example, according to Lotus WordPro word processor (Lotus and WordPro are Trademarks of International Business Machine Corporation), the file path, the name of the author, the date of creation, and many other attributes can be viewed when looking at the document properties.

As it will become apparent to the one skilled in the art, the modified copy function can be used to create a modified cut function where the main differences consist in the further step of removing the selected text in the source document.

In a further embodiment, the modified copy function further comprises a test to determine whether or not the selected text has been previously copied from another source document. Such enhanced modified copy function further comprises the steps of, parsing the selected text for checking the presence of copied text portions by checking the presence of tags marking the beginning of copied object structure headers e.g., <©, the presence of tags marking the end of copied object structure headers e.g., ©>, or the presence of tags marking the end of copied object structures e.g., </©>; and, if copied text portions are found in the selected text, forewarning the user.

Preferably, the source addresses or URLs of the copied text portions are shown to the user when he/she is forewarned, by extracting the path or URL from the header of each copied object found in the selected text.

Modified Paste Function

The standard paste function is not modified in itself. It essentially consists in copying the copied object stored into the clipboard, in the object document, at the cursor location. The copied object is copied in the object document, in its entirety i.e., the text to be copied and the source information are copied in the object document. Depending upon display option setup, source information is displayed or not. In a preferred embodiment, the copied text is highlighted so that it appears differently than text that has not been copied or that has been copied from different sources. Still in a preferred embodiment, the copied text is highlighted only when the cursor is located over an area of copied text. To that end, the application checks the tag marking the end of the copied object header e.g., ©>, and the tag marking the end of the copied object e.g., </©>, and highlights the text comprised between both tags if the cursor is located over the corresponding text. For example, highlighting copied text can consist in using a particular background colour e.g., yellow background.

When only displaying the copied text of a copied object i.e., when the source information must not been displayed, the display function parses the copied object to determine the tags marking the copied object e.g. <©, ©>, and </©>, and the data comprised in the header e.g., between tags <©, ©>. The tags marking the copied object e.g. <©, ©>, and </©>, and the data comprised in the header e.g., between tags <©, ©>, are not displayed.

Edit Monitoring Function

Editing a text implies that the text can be modified: some portions of the text can be removed and/or other portions of text can be inserted. An inserted portion of text can be typed or can be copied from another document. As a consequence, when a text is edited, the system must be able to track which parts of text have been modified and must keep the source information of copied text that is not modified.

If a portion of text is copied from another source document, the modified copy and paste functions are used to associate the source information to the copied text, as described above.

According to the invention, a background function, referred to as edit monitoring function, monitors the position of the cursor in the text in order to determine if portions of text are inserted or removed in the copied text, preferably highlighted.

When a portion of text is inserted or removed, the edit monitoring function checks if the cursor is positioned within copied text. This is done by checking if the text portion comprising the cursor is highlighted, by checking if the tag marking the beginning of the copied object structure header e.g., <©, is located before the cursor and no tag marking the end of the copied object structure e.g., </©>, is located between the cursor and the tag marking the beginning of the copied object structure header, or by checking if the tag marking the end of the copied object structure e.g., </©>, is located after the cursor and no tag marking the beginning of the copied object structure header e.g., <©, is located between the cursor and the tag marking the end of the copied object structure.

When a portion of text is removed from a copied text, the tag marking the end of the copied object structure e.g., </©>, is inserted where the portion of text has been removed. The header of the copied object preceding the cursor, with the tags marking the beginning and the end of the copied object structure header, is copied where the portion of text has been removed, behind the inserted tag marking the end of the copied object structure.

Let us consider, for sake of illustration, the following text, where the tags and the source information are apparent,
This is an example of copied text, <©href="C:\tmp\test.txt"©> here is copied text </©>.

If the word "the" of the copied text is removed, the new text, where the tags and the source information are apparent, looks like,
This is an example of copied text, <©href="C:\tmp\test.txt"©> here is </©><©href="C:\tmp\test.txt"©> copied text </©>.

If a portion of text is inserted in a copied text, the tag marking the end of a copied object structure e.g., </©>, is inserted where the portion of text has been inserted, preceding the inserted portion of text. The header of the copied object preceding the cursor, including the tags marking the beginning and the end of the copied object structure header, is copied where the portion of text has been inserted, behind the inserted portion of text.

Let us consider, for sake of illustration, the previous example, where the tags and the source information are apparent, This is an example of copied text, <©href="C:\tmp\test.txt"©> here is the copied text </©>.

If the words "example of" are inserted after the word "the" of the copied text, the new text, where the tags and the source information are apparent, looks like,
This is an example of copied text, <©href="C:\tmp\test.txt"©> here is the </©> example of <©href="C:\tmp\test.txt"©> copied text </©>.

In another embodiment, the edit monitoring function comprises the step of marking all the words of copied text so as to identify non marked words corresponding to words that have been added. According to this embodiment, the edit monitoring function comprises the steps of, prior to editing a copied text, marking all the words of the copied text e.g., by appending the symbol '*' in front of each word of the copied text; and, after editing the copied text,
identifying all marked word fragments i.e., sets of contiguous marked words; and,
for each marked word fragment, creating an object structure that header is the one of the copied object corresponding to the edited copied text.

Obviously, different marking symbols can be used to mark portions of text copied from different source documents.

Access Function

An access function is preferably provided to the user so that he/she could readily identify, locate and retrieve the source document from which the text that he/she is manipulating e.g., displaying or editing, has been copied. Such function can be triggered when the cursor is located over an area of copied text, either by clicking the pointing device on the copied text area, by selecting the access function in a menu or a popup menu, or even by using control keys. As shown on FIG. 3, the main steps of the access function are, selecting the copied object corresponding to the copied text pointed by the cursor (step 300);
extracting the path or URL stored within the selected copied object (step 305);
accessing the source document using the path or URL (step 310); and,
displaying the source document (step 315).

Displaying the source document can be done according to the standard method consisting in analyzing the type of the source document e.g., according to the file extension, and launching the corresponding application according to a correspondence table e.g., file MIME type, generally maintained by the operating system.

In a further embodiment, the copied text portion is highlighted in the source document. Searching the copied text can be done, for example, by means of standard string matching algorithm, by sequentially comparing the copied text portion with the source document.

EXAMPLE

Figures 4D, 4E, 5:
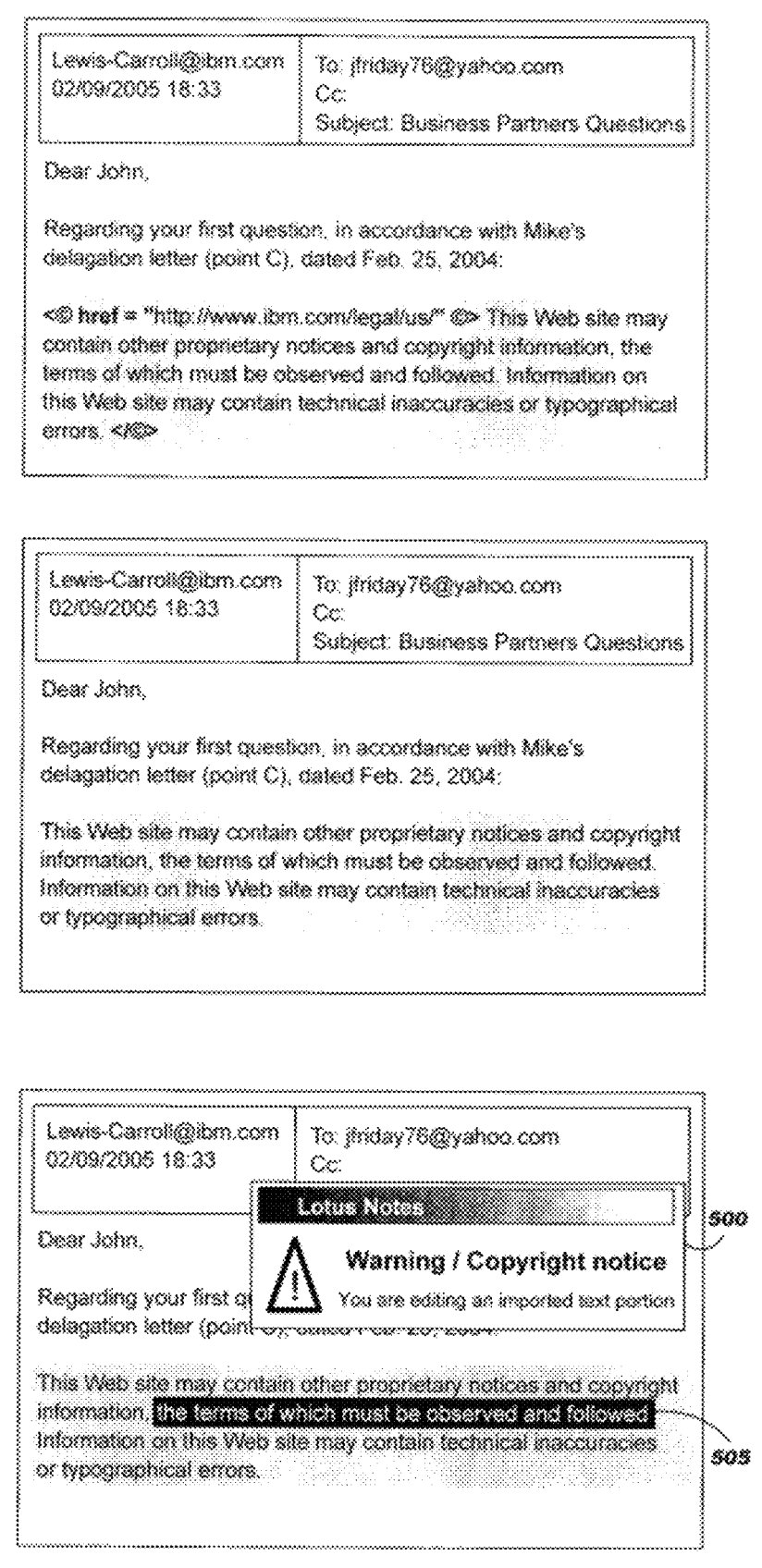

FIGS. 4a to 4e illustrate the main steps of the method of using the modified copy function, according to the invention. FIG. 4a shows a typical example of an e-mail 400 in which a user wants to copy the text selected on the web page shown on FIG. 4b. As illustrated, the e-mail 400 comprises a header 405 with information about the sender, the recipient, and the e-mail subject, and a text area 410 where the user types his/her message. In this example, the user has already typed a first part of the message. The cursor 415 points to the position where the user can type new text or where he/she can paste copied text. The web page 420 of FIG. 4b comprises selected text 425 that the user wants to copy in his/her e-mail at the cursor position. FIG. 4c shows the copied object created after copying the selected text of FIG. 4b, including the corresponding source information i.e., the URL 430.

FIG. 4c depicts the copied object created after copying the selected text 425 from the web page 420 shown on FIG. 4b. As described above, the created copied object comprises a tag <©> marking the beginning of the copied object structure header, the hyperlink reference 435 comprising the URL 430, a tag ©> marking the end of the copied object structure header, the text 440 which is copied, that corresponds to selected text 425, and a tag </©> marking the end of the copied object structure.

FIG. 4d shows the e-mail 400 after the copied text has been pasted, where the source information, as well as the control symbols, are being displayed; FIG. 4e illustrates the same e-mail after the copied text has been pasted, where the source information and the control symbols are being hidden. As mentioned above, the choice of displaying or not the source information and the control symbols, as illustrated on FIGS. 4d and 4e, respectively, can be controlled by the application display setup. For sake of illustration, the copied text is highlighted.

FIG. 5 illustrates an example of a warning message 500 displayed to the user when attempting to copy a text already copied from a source document. In this example, the user, after having selected a portion of the text 505, has invoked either the modified copy or cut function. In such case, the copied object is created as described above, but the user is also warned that he/she may infringe copyrights.

FIG. 6 shows an example of accessing the source document of a copied portion of text. As illustrated, the copied text is highlighted when the user places the cursor 600 on the copied text area. Then, the user can choose to invoke the access function by different means e.g., editor tolls, menu, pop-up menu, left mouse click, or control keys. When the access function is called, a confirmation window 605 is preferably displayed, showing the path or URL extracted from the copied object associated to the copied text under the cursor position, so that the user can choose accessing or not the source document. Availability of this function is particularly useful, for example, when the source document should be accessed through a network e.g., the Internet, while the user is disconnected.

Encapsulated Object Structure

In a further embodiment, the encoding of the source information and copied text comprises an identifier allowing encapsulated identification of the source information. According to this embodiment, the copied object structure is as follows, <©ID href="path or URL"; optional data©> copied text</©ID>wherein, <© marks the beginning of the header of the copied object structure;

ID is the unique identifier of the copied object;

href="path or URL" encodes the path or URL of the document from which the copied text has been extracted;

; is a separator. This symbol is used only in the case where "optional data" is stored in the object along with the source information;

optional data encodes additional optional source information such as the name of the author, the date of creation, and the owner of intellectual property rights of the source document;

©> marks the end of the copied object structure header; copied text is the portion of text that has been extracted from the source document; and, </©ID> marks the end of the copied object structure having ID as identifier.

Using a unique identifier per copied object enables to build encapsulated references, useful to trace the history of the source documents, and incidentally, to check and attribute the copyrights. For example, if a user pastes portions of text from two different source documents in a first target document and then, a second user copies the text of the first target document and pastes it into a second target document, it can be of utmost importance not only to identify the sources of each part of the text but also the source of the compilation.

Figure 7A:
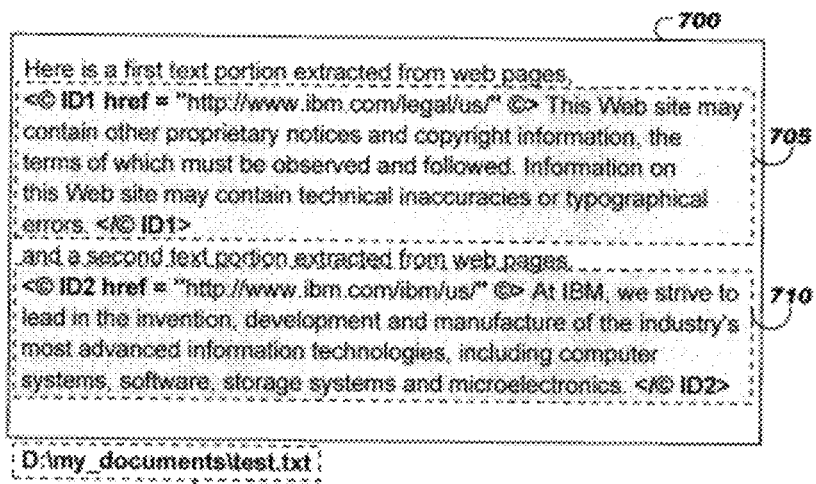
FIGS. 7a and 7b, depicts an example of the use of the encapsulated object structure according to one embodiment of the invention.
Figure 7B:
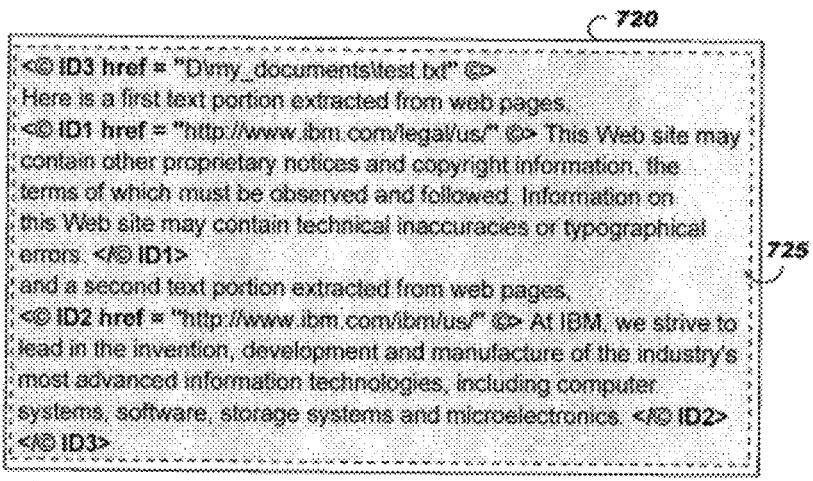

FIG. 7, comprising FIGS. 7a and 7b, depicts an example of the use of the encapsulated object structure. FIG. 7a shows a document 700 comprising text. Some portions of the text of document 700 have been typed by the author of such document while other portions, referred to as 705 and 710, have been copied from two different sources, as shown encoded within the source information. Document 700 is locally stored on a computer, having the file name "test.txt" and being accessible through the full path 715: "D:\my_documents\test.txt". As shown on FIG. 7a, the copied object corresponding to the first part of copied text has a first identifier, ID1, while the copied object corresponding to the second part of copied text has a second identifier, ID2. FIG. 7b depicts another document 720 wherein text imported from document 700 has been copied. As illustrated on FIG. 7b, a copied object has been created for the highlighted copied text 725. The identifier of this object is different than that of the other copied objects contained within the document 720. The path associated to this new created copied object is that of the document 700 from which the text has been copied. As a consequence, document 720 contains references not only to document 700 from which the text of document 720 has been copied but also to other documents from which portions of text were themselves copied into document 700.

The modified set of functions handling the encapsulated object structure is slightly different than the one described above.

Modified Copy Function for Encapsulated Object Structure

Figure 8:
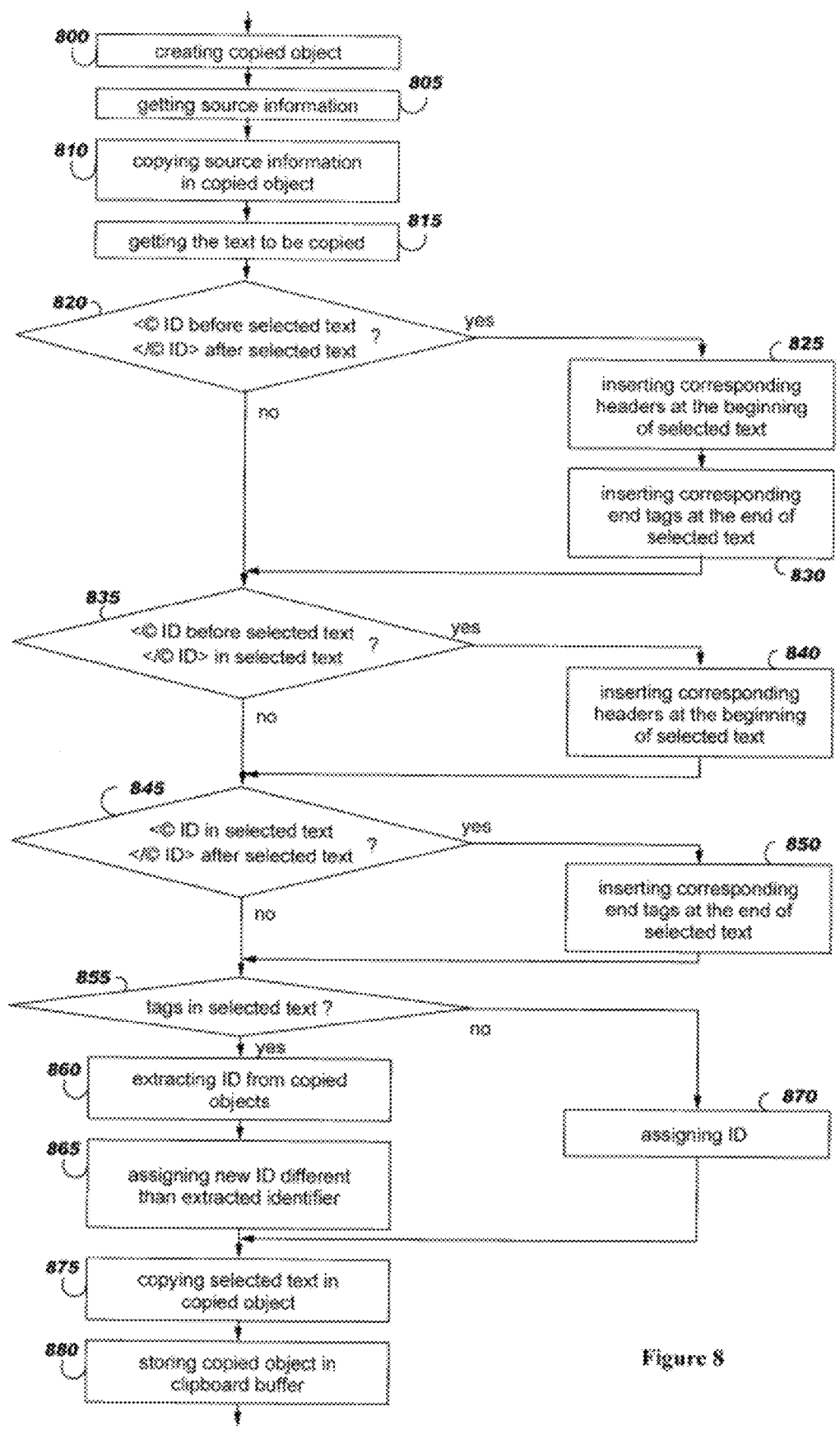
FIG. 8 depicts the main steps of the modified copy function for encapsulated object structure according to the invention.

Since the encapsulated object structure comprises an identifier, it is required to determine the identifiers of the copied objects embedded within the text to be copied when creating the copied object which stores the text to be copied and the source information. As depicted on FIG. 8 and according to the modified copy function for encapsulated object structure, the following steps are executed when this function is called after having selected the text to be copied, creating a copied object (step 800);
    getting the source information (step 805);
    copying the source information within the header of the created copied object (step 810);
    getting the selected text to be copied (step 815);
    determining the identifiers of the copied object that tag marking the beginning of the header is located before the selected text and that tag marking the end is located behind the selected text (step 820) and for each of these determined identifiers,
        inserting the header of the corresponding copied object at the beginning of the selected text (step 825); and,
        inserting the tag marking the end of the corresponding copied object at the end of the selected text (step 830);
    determining the identifiers of the copied object that tag marking the beginning of the header is located before the selected text and that tag marking the end is located in the selected text (step 835) and for each of these determined identifiers,
  inserting the header of the corresponding copied object at the beginning of the selected text (step 840);
determining the identifiers of the copied object that tag marking the beginning of the header is located in the selected text and that tag marking the end is located behind the selected text (step 845) and for each of these determined identifiers,
  inserting the tag marking the end of the corresponding copied object at the end of the selected text (step 850);
checking if copied text portions are present in the selected text by parsing the selected text and determining if the selected text comprises tags marking the beginning and the end of a temporary computer objects (step 855);
if copied text is found in the selected text,
  extracting the identifiers of the copied objects embedded within the selected text (step 860);
  assigning a new identifier, different than the extracted identifiers (step 865);
else, if no copied text is found in the selected text, assigning an identifier (step 870);
copying the selected text within the created copied object (step 875); and,
storing the created copied object with the assigned identifier into the clipboard buffer (step 880).

In a further embodiment, the user is forewarned when copied text is found in the text to be copied. In such case, the source of each copied text is preferably indicated to the user, by extracting the path or URL of each copied object, as described above.

Modified Paste Function for Encapsulated Object Structure

The paste function is slightly modified to prevent for pasting copied objects having the same identifier as another copied object already present in the document where the text is being pasted. For this purpose, before pasting a copied object, the paste function parses the document, searching for identifiers of copied objects already present in it. If no copied object is found in the document, the paste function operated similarly to the one described above. In the case where copied objects are found in the document, the identifiers of these copied objects are compared with those of the copied object containing the text to be pasted. It should be noticed that the copied object corresponding to the text to paste may contain itself several copied objects. If one or more identifiers are identical, the common identifiers are modified so that all resulting identifiers become different. When modifying an identifier, the identifier value is changed in the copied object header and in the set of tags marking the end of the copied object structure. Once all the identifiers are different, the paste function is applied, as described above by reference to non-encapsulated copied object structure.

Edit Monitoring Function for Encapsulated Object Structure

As mentioned above, a background function, referred to as edit monitoring function, monitors the position of the cursor in the text in order to determine if portions of text are inserted or removed in copied text. If a portion of text is inserted or removed, the edit monitoring function checks if the cursor is positioned within copied text. To that end, the edit monitoring function checks if the cursor is located between the tags marking the beginning and the end of a same copied object structure, by checking tags and identifiers. In this case, the edit monitoring function determines all the identifiers associated to tags marking the beginning and the end of a copied object structure that are arranged on each side of the cursor. These identifiers are preferably stored in a list of identifiers.

If a portion of text is removed from a copied text i.e., the list of identifiers comprises at least one identifier, the tag marking the end of the copied object structure e.g., </©ID>, is inserted where the portion of text has been removed. One tag is inserted for each identifier of the list of identifiers, with the corresponding identifier. Likewise, the copied object headers corresponding to the identifiers of the list of identifiers are inserted where the portion of text has been removed, after the inserted tags marking the end of the copied object structure. The inserted copied object headers comprise the tags marking the beginning and the end of the copied object structure header, with the corresponding identifier, the path or URL, and the optional data (if present).

Let us consider, for sake of illustration, the following text, where the tags and the source information are apparent,
This is an example of copied text, <©ID1href= "C:\tmp\test1.txt"©> here is a <©ID2href= "C:\tmp\test2.txt"©> copied </©ID2> text including several text portions </©ID1><©ID3href="C:\tmp\test3.txt"©> from different sources </©ID3>.

If the word "several" of the copied text is removed, the new text, where the tags and the source information are apparent, is as follows,
This is an example of copied text, <©ID1href= "C:\tmp\test1.txt"©> here is a <©ID2href= "C:\tmp\test2.txt"©> copied </©ID2> text including </©ID1><©ID1href="C:\tmp\test1.txt"©> text portions </©ID1><©ID3href="C:\tmp\test3.txt"©> from different sources </©ID3>.

If a portion of text is inserted in a copied text i.e., the list of identifiers comprises at least one identifier, the tag marking the end of the copied object structure e.g., </©ID>, is inserted where the portion of text has been inserted, in front of the inserted portion of text. One tag is inserted for each identifier of the list of identifiers, with the corresponding identifier. Likewise, the copied object headers corresponding to the identifiers of the list of identifiers are inserted where the portion of text has been inserted, after the inserted portion of text. The inserted copied object headers comprise the tags marking the beginning and the end of the copied object structure header, with the corresponding identifier, the path or URL, and the optional data (if present).

Let us consider, for sake of illustration, another example, where the tags and the source information are apparent, This is an example of copied text, <©ID1href= "C:\tmp\test1.txt"©> here is a <©ID2href= "C:\tmp\test2.txt"©> copied text</©ID2> including several text portions </©ID1><©ID3href="C:\tmp\test3.txt"©> from different sources </©ID3>.

If the words "and linked" are inserted after the word "copied" of the copied text, the new text, where the tags and the source information are apparent, looks like,
This is an example of copied text, <©ID1href= "C:\tmp\test1.txt"©> here is a <©ID2href= "C:\tmp\test2.txt"©> copied </©ID2></©ID1> and linked <©ID1href="C:\tmp\test1.txt"©><©ID2href= "C:\tmp\test2.txt"©> text </©ID2> including several text portions </©ID1><©ID3 href="C:\tmp\test3.txt"©> from different sources </©ID3>.

Access Function for Encapsulated Object Structure

Figure 9:
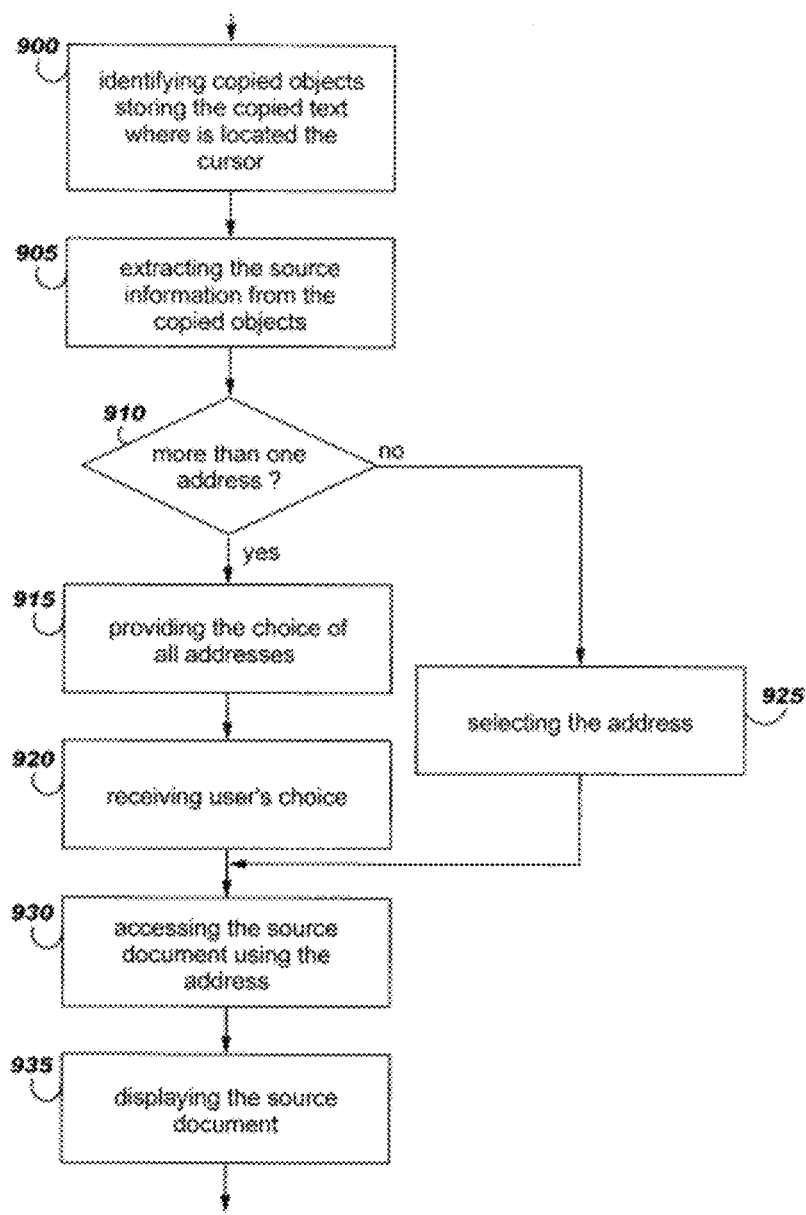
FIG. 9 shows the main steps of the access function for encapsulated object structure according to the invention.

As mentioned above, an access function is preferably provided to the user so that he/she could easily browse or retrieve the source document from which the text he/she is manipulating e.g., displaying or editing, has been copied. Such function can be activated when the cursor is located in the area of copied text by different means e.g., by clicking the pointing device in the area of copied text, by selecting the access function in a menu or a popup menu, or by using control keys. As shown on FIG. 9, the main steps of the access function are as follows, identifying copied objects comprising the copied text where the cursor is located (step 900);
extracting the paths or URLs of the copied text from the identified copied objects (step 905);
checking the number of identified paths or URLs (step 910),
if there are more than one path or URL,
providing the choice to the user for selecting one path or URL from the identified paths or URLs (step 915);
receiving the user's choice of the selected path or URL (step 920);
else, if only one path or URL is identified, selecting this path or URL (step 925);
accessing the source document using the selected path or URL (step 930); and,
displaying the source document (step 935).

Displaying the source document is done according to the standard method consisting in analyzing the type of the source document e.g., according to its extension, and launching the corresponding application according to the correspondence table of the operating system.

Naturally, in order to satisfy local and specific requirements, a person skilled in the art may apply to the solution described above many modifications and alterations all of which, however, are included within the scope of protection of the invention as defined by the following claims.

The invention claimed is:

1. A method for processing electronic documents, said method comprising:
   a processor displaying a first electronic document, said displaying comprising displaying first text appearing in the first electronic document;
   said processor obtaining, from a web page differing from the first electronic document, both selected text and an address of a source electronic document that comprises the selected text;
   said processor copying a first tag, a second tag, and the obtained address of the source into a header of a temporary computer object, wherein the first tag marks the beginning of the header and the second tag marks the end of the header, and wherein the address of the source electronic document is disposed between the first tag and the second tag in the header;
   said processor copying the obtained selected text into the temporary computer object;
   said processor copying the third tag into the temporary computer object, wherein the third tag marks the end of the temporary computer object, and wherein the selected text is disposed between the header of the temporary computer object and the third tag;
   said processor storing the temporary computer object in a second electronic document after the first text;
   after said storing the temporary computer object, said processor ascertaining that a portion of text is removed from the selected text or is inserted in the selected text;
   in response to said ascertaining:
   said processor inserting the third tag at a first position where the portion of text is removed or at a second position preceding a third position where the portion of text is inserted; and
   said processor inserting a string at the first position where the portion of text is removed or at the second position preceding the third position where the portion of text is inserted, wherein the string is a concatenation of the first tag, an address associated to the selected text, and the second tag.

2. The method of claim 1, said method comprising:
   after said storing, said processor extracting, from the header of the temporary computer object stored in the second electronic document, the address of the first electronic document;
   said processor accessing the source electronic document using the extracted address; and
   said processor displaying the accessed first electronic document.

3. The method of claim 2, wherein the selected text obtained from the source document comprises a portion of text, and wherein said method comprises:
   said processor determining that the portion of text is comprised by each temporary computer object of more than one temporary computer object, wherein a header in each temporary computer object of the more than one computer object comprises an address of an electronic file that comprises the portion of text and is specific to the temporary computer object;
   said processor extracting the addresses from the headers in the more than one temporary computer object;
   said processor providing a choice comprising the extracted addresses; and
   said processor receiving a selection of one extracted address from the provided choice.

4. The method of claim 1, wherein the header consists of the first tag, the address of the first electronic document, and the second tag.

5. The method of claim 1, wherein the header consists of the first tag, an identifier of the temporary computer object, an attribute pertaining to the address of the source electronic document, the address of the first electronic document paired in the header with the attribute, additional information pertaining to the first electronic document, and the second tag, and wherein the additional information consists of an author of the first electronic document, a date of creation of the first electronic document, and an owner of the intellectual property rights of the first electronic document.

6. A computer system, comprising a processor and a memory device containing computer readable instructions configured to be executed by the processor to implement a method for processing electronic documents, object, said method comprising:
   said processor displaying a first electronic document, said displaying comprising displaying first text appearing in the first electronic document;
   said processor obtaining, from a web page differing from the first electronic document, both selected text and an address of a source electronic document that comprises the selected text;
   said processor copying a first tag, a second tag, and the obtained address of the source into a header of a temporary computer object, wherein the first tag marks the beginning of the header and the second tag marks the end of the header, and wherein the address of the source electronic document is disposed between the first tag and the second tag in the header;
   said processor copying the obtained selected text into the temporary computer object;
   said processor copying a third tag into the temporary computer object, wherein the third tag marks the end of the temporary computer object, and wherein the selected text is disposed between the header of the temporary computer object and the third tag;

said processor storing the temporary computer object in the first electronic document after the first text;

after said storing the temporary computer object, said processor ascertaining that a portion of text is removed from the selected text or is inserted in the selected text;

in response to said ascertaining:

said processor inserting the third tag at a first position where the portion of text is removed or at a second position preceding a third position where the portion of text is inserted; and said processor inserting a string at the first position where the portion of text is removed or at the second position preceding the third position where the portion of text is inserted, wherein the string is a concatenation of the first tag, an address associated to the selected text, and the second tag.

7. The computer system of claim 6, said method comprising:

after said storing, said processor extracting, from the header of the temporary computer object stored in the second first electronic document, the address of the source electronic document;

said processor accessing the source electronic document using the extracted address; and said processor displaying the accessed source electronic document.

8. The computer system of claim 7, wherein the selected text obtained from the first document comprises a portion of text, and wherein said method comprises:

said processor determining that the portion of text is comprised by each temporary computer object of more than one temporary computer object, wherein a header in each temporary computer object of the more than one computer object comprises an address of an electronic file that comprises the portion of text and is specific to the temporary computer object;

said processor extracting the addresses from the headers in the more than one temporary computer object;

said processor providing a choice comprising the extracted addresses; and said processor receiving a selection of one extracted address from the provided choice.

9. The computer system of claim 6, wherein the header consists of the first tag, the address of the source electronic document, and the second tag.

10. The computer system of claim 6, wherein the header consists of the first tag, an identifier of the temporary computer object, an attribute pertaining to the address of the source electronic document, the address of the source electronic document paired in the header with the attribute, additional information pertaining to the first electronic document, and the second tag, and wherein the additional information consists of an author of the source electronic document, a date of creation of the first electronic document, and an owner of the intellectual property rights of the source electronic document.

11. A hardware storage device, comprising computer readable instructions configured to be executed by a processor of a computer system to implement a method for processing electronic documents, object, said method comprising:

said processor displaying a first electronic document, said displaying comprising displaying first text appearing in the first electronic document;

said processor obtaining, from a web page differing from the first electronic document, both selected text and an address of a source electronic document that comprises the selected text;

said processor copying a first tag, a second tag, and the obtained address of the source into a header of the created temporary computer object, wherein the first tag marks the beginning of the header and the second tag marks the end of the header, and wherein the address of the source electronic document is disposed between the first tag and the second tag in the header;

said processor copying the obtained selected text into the temporary computer object;

said processor copying a third tag into the temporary computer object, wherein the third tag marks the end of the temporary computer object, and wherein the selected text is disposed between the header of the temporary computer object and the third tag; and said processor storing the temporary computer object in the first electronic document after the first text;

after said storing the temporary computer object, said processor ascertaining that a portion of text is removed from the selected text or is inserted in the selected text;

in response to said ascertaining:

said processor inserting the third tag at a first position where the portion of the text is removed or at a second position preceding a third position where the portion of text is inserted; and said processor inserting a string at the first position where the portion of text is removed or at the second position preceding the third position where the portion of text is inserted, wherein the string is a concatenation of the first tag, an address associated to the selected text, and the second tag.

12. The storage device of claim 11, said method comprising:

after said storing, said processor extracting, from the header of the temporary computer object stored in the first electronic document, the address of the source electronic document;

said processor accessing the source electronic document using the extracted address; and said processor displaying the accessed source electronic document.

13. The storage device of claim 12, wherein the selected text obtained from the source document comprises a portion of text, and wherein said method comprises:

said processor determining that the portion of text is comprised by each temporary computer object of more than one temporary computer object, wherein a header in each temporary computer object of the more than one computer object comprises an address of an electronic file that comprises the portion of text and is specific to the temporary computer object;

said processor extracting the addresses from the headers in the more than one temporary computer object;

said processor providing a choice comprising the extracted addresses; and said processor receiving a selection of one extracted address from the provided choice.

14. The storage device of claim 11, wherein the header consists of the first tag, the address of the first electronic document, and the second tag.

15. The storage device of claim 11, wherein the header consists of the first tag, an identifier of the temporary computer object, an attribute pertaining to the address of the source electronic document, the address of the source electronic document paired in the header with the attribute, additional information pertaining to the source electronic document, and the second tag, and wherein the additional information consists of an author of the source electronic document, a date of creation of the source electronic document, and an owner of the intellectual property rights of the first electronic document.

16. method of claim 1, wherein the first text is a first portion of an electronic message, wherein said displaying the first electronic document comprises displaying a cursor at a cursor position after the first text for receiving an additional portion of the message at the cursor position, and wherein said storing the temporary computer object in the first electronic document comprises storing the temporary computer object at the cursor position in the first electronic document, wherein the stored temporary computer object is the additional portion of the message at the cursor position.

17. The method of claim 16, wherein the first electronic document is an electronic mail, and wherein the first text and the temporary computer object are stored in a text area of the electronic mail.

\* \* \* \* \*